United States Patent
Fuchs et al.

(10) Patent No.: US 7,424,448 B2
(45) Date of Patent: Sep. 9, 2008

(54) METHOD FOR QUANTITY CHECKING OF PRODUCT PURCHASE ORDERS

(75) Inventors: Carsten Fuchs, Wiesloch (DE); Horst Juettner, Mannheim (DE); Martin Semmler, Angelbachtal (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/387,154

(22) Filed: Mar. 23, 2006

(65) Prior Publication Data

US 2007/0226067 A1 Sep. 27, 2007

(51) Int. Cl.
*G06Q 30/00* (2006.01)

(52) U.S. Cl. ............................. 705/26; 705/1; 705/27; 705/28

(58) Field of Classification Search .............. 705/26, 705/27, 1, 28
See application file for complete search history.

(56) References Cited

U.S. PATENT DOCUMENTS

| 6,983,200 | B2* | 1/2006 | Bodin et al. ................ 701/33 |
|---|---|---|---|
| 2002/0026347 | A1* | 2/2002 | Yanagino et al. ............ 705/10 |
| 2002/0035495 | A1* | 3/2002 | Spira et al. ................. 705/7 |
| 2002/0103727 | A1* | 8/2002 | Tait et al. .................. 705/28 |
| 2002/0116246 | A1* | 8/2002 | Wippersteg ................. 705/8 |
| 2002/0169657 | A1* | 11/2002 | Singh et al. ................ 705/10 |
| 2003/0074282 | A1* | 4/2003 | Lee ........................... 705/26 |
| 2003/0144916 | A1* | 7/2003 | Mumm et al. .............. 705/26 |
| 2003/0172007 | A1* | 9/2003 | Helmolt et al. ............. 705/28 |
| 2004/0024661 | A1* | 2/2004 | Freel et al. ................. 705/28 |
| 2004/0122691 | A1* | 6/2004 | Lupp et al. .................. 705/1 |
| 2005/0203813 | A1* | 9/2005 | Welter et al. ............... 705/27 |
| 2005/0216359 | A1* | 9/2005 | Welter et al. ............... 705/26 |
| 2006/0031110 | A1* | 2/2006 | Benbassat et al. ............ 705/9 |
| 2006/0206289 | A1* | 9/2006 | Stake et al. ................ 702/184 |
| 2006/0217993 | A1* | 9/2006 | Anderson .................... 705/1 |
| 2007/0233576 | A1* | 10/2007 | Finke et al. ................ 705/26 |

OTHER PUBLICATIONS

Maskell, Brian H., Distribution Resource Planning, Jun. 1988, Manufacturing Systems, pp. 60-64.*
Maskell, Brian H., Distribution Resouorce Planning, Jun. 1988, Manufacturing Systems, pp. 60-64.*
Selected pp. 16 of documentation for SAP Customer Relationship Management (CRM) Version 4.0 software, release date Sep. 2004, [retrieved on Mar. 23, 2006]. Retrieved from the Internet: <URL: http://help.sap.com/saphelp_crm40srl >.

* cited by examiner

*Primary Examiner*—Jeffrey A. Smith
*Assistant Examiner*—Jason B. Dunham
(74) *Attorney, Agent, or Firm*—Fish & Richardson P.C.

(57) ABSTRACT

A computer-implemented method for processing spare parts purchase orders includes receiving, during a manufacturing planning phase, an estimate of the number of the spare parts that will be needed to be produced during a given period to satisfy expected purchase orders for the spare part. The method also includes receiving a user-defined configurable reasonable quantity rule to be used during processing of electronic purchase order information. The method further includes, upon receipt of an electronic purchase order, determining whether a quantity value included in the electronic purchase order is reasonable using the defined reasonable quantity check rule, and if determined unreasonable, generating an indication that the quantity value was determined to be unreasonable.

13 Claims, 8 Drawing Sheets

METHOD FOR QUANTITY CHECKING OF PRODUCT PURCHASE ORDERS

TECHNICAL FIELD

This invention relates to processing product purchase or sales orders, such as orders for spare parts.

BACKGROUND

An example enterprise computing system includes a system that receives customer product purchase orders and another computing system that manages the manufacturing of products that are the subject of product purchase orders. A customer relationship management (CRM) computing system—namely, a system that may manage all interactions with customers, including marketing, sales, and service, for example—is one example of a computing system that may include a product purchase order computing component. Information received in a product purchase order is often provided to a manufacturing-related computing system that controls the fulfillment, including manufacturing if necessary, of the product purchasing order.

The product purchase order and subsequent processing has become increasingly automated in modern systems over the years. In many cases, however, it would be desirable for there to be user involvement to correct possible errors and in general to oversee the processing, but in a manner that does not undercut efficiencies achieved by the automation. This is especially true in a scenario where product purchase orders include very large quantities of perhaps valuable components that may have to be manufactured in order for the order to be fulfilled. One example of such a scenario is with spare parts for automobiles or other high-value products. In this scenario, product purchase orders may be received, in most cases electronically over an electronic data interface (EDI), or a business-to-business link. In this scenario, it may be that the customer does the data entry, including data entry of quantity values for certain spare parts. With customer data entry comes the possibility for operator error.

One area in which user involvement may be beneficial is in checking whether the quantity of product as specified in a product purchase order makes sense or not (that is, whether the quantity is reasonable or not). Determining this includes many considerations that makes human involvement and judgment beneficial, but simply requiring a human to check the quantity for every received order may be undesirable in many cases. In addition, because a manufacturer may have many different spare parts it produces and sells and many different customers, the task of checking whether a quantity value makes sense in a received product purchase order for a particular customer may have many variables and is not amenable to a "one size fits all" solution.

SUMMARY

This document describes a feature for sales order processing that introduces a reasonableness determination as to a quantity requested in a sales order. In one aspect, the document describes a computer-implemented method for processing spare parts purchase orders, as well as computer program products with executable program instructions and systems used in performing the method.

The method includes receiving, during a manufacturing planning phase, an estimate of the number of the spare parts that will be needed to be produced during a given period to satisfy expected purchase orders for the spare part. The method also includes receiving a user-defined configurable reasonable quantity rule to be used during processing of electronic purchase order information. The method further includes, upon receipt of an electronic purchase order, determining whether a quantity value included in the electronic purchase order is reasonable using the defined reasonable quantity check rule, and if determined unreasonable, generating an indication that the quantity value was determined to be unreasonable.

In various implementations, the method may include one or more of the following features. The purchase orders may be for automobile spare parts and include electronic data entered by agents of automobile dealers. In such a case, the reasonable quantity rule may be dependent on a particular automobile dealer.

In addition, the estimate of the number of the spare parts that will be needed may be made during a part manufacturing cost process. In such a case, the estimate may include estimates provided by individual dealers. In addition, the reasonable quantity rule may be a percentage value, and may include a first percentage value that gives warning and a second percentage value that gives an error message.

The method may further include performing a required confirmation process that the quantity is correct if the quantity of the received purchase order is determined unreasonable based on a comparison with the first percentage value. Also, the method may include forwarding a warning indicator but not performing a required confirmation process that the quantity is correct if the quantity of the received purchase order is determined potentially unreasonable based on a comparison with the second percentage value.

Computer program products used in performing the method may include executable program instructions tangibly embodied in an information carrier, such as program memory. When executed by a processor, for example, the methods described above and as follows may be executed.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
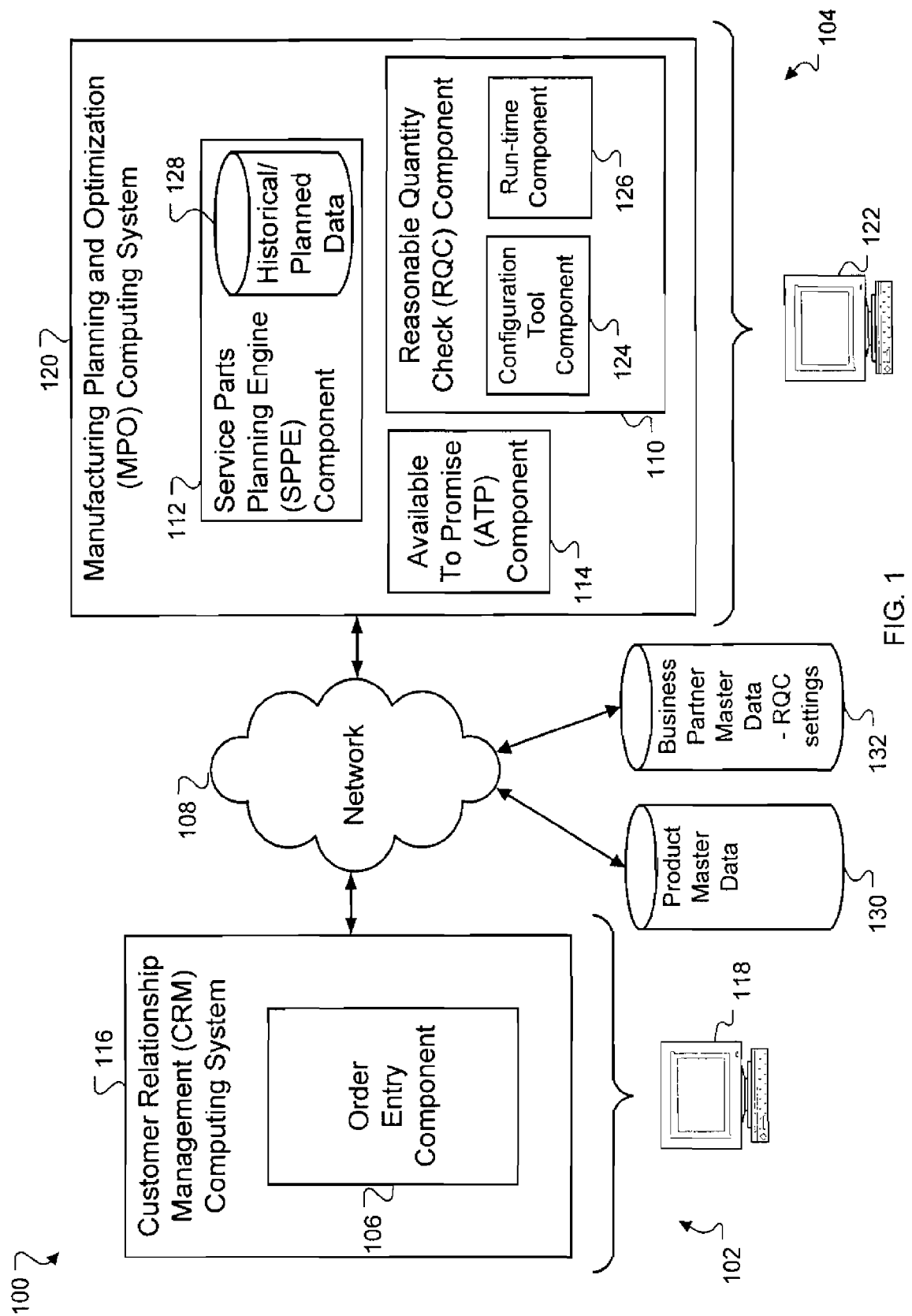
FIG. 1 is a block diagram of an exemplary distributed computing system in which spare parts sales order reasonable quantity checking techniques are employed.

A distributed computing system 100, shown in FIG. 1, is an example of a system in which spare parts sales orders (which may be referred to as spare parts purchase orders), for example, may be processed. The example system 100 of FIG. 1 includes two networked computer systems, which in this example are a customer relationship management (CRM) computing system 102 and a manufacturing planning and optimization (MPO) computing system 104.

The CRM computing system 102 is an example of a system in which a customer's sales order (which may be referred to as a customer's purchase order or a customer's product order) may be created. Generally, a CRM computing system performs functions that manage a company's interactions with customers, which may include sales functions, marketing functions and service functions, for example. For present purposes, it is sufficient to understand that the CRM system 102 is one in which customer sales orders may be generated.

The MPO computing system 104 is an example of a system that performs manufacturing-related functions, such as functions in which manufacturing is planned and functions in which the manufacturing is optimized. The manufacturing may be, for example, the manufacturing of spare parts, such as automobile spare parts. For present purposes, it is sufficient to understand that the MPO computing system 104 of FIG. 1 is used to implement reasonable quantity checking procedures for a spare parts sales order entered into, or received by, the CRM computing system 102. The CRM computing system 102 and the MPO computing system 104 in the FIG. 1 example communicate with one another by a network 108 that interconnects the two systems.

The CRM computing system 102 may be configured to execute a spare parts sales order entry process, either entirely within the CRM computing system 102 or upon receipt of external electronic information. To do so, the CRM computing system 102 in the FIG. 1 example includes server-side equipment 116 with a server-based order entry component 106. In one example, the FIG. 1 computing system 100 may be for use by an automobile company that manufactures and delivers to customers (e.g., dealers) automobiles and spare parts. In such an example, spare parts sales orders may be received by the CRM system 116, and specifically the order entry component 106. The orders may come from authorized dealers or from other automobile service companies, for example. In many cases, though not in all cases, spare parts sales orders may be received electronically from a dealer over a business-to-business connection to the system 100 (though not shown in FIG. 1). In such a case, a user in a dealer organization may be responsible for entering information into a sales order document at a client computer device of the dealer's computing system. The CRM computing system 102 typically includes client devices for users, and in the FIG. 1 example, one such client device 118 is shown for simplicity. The client device 118 may be a desktop computer or a mobile computing system such as a laptop, for example. As an alternative to the business-to-business sales order process described above, sales orders may be entered using client device 118, by a sales agent, for example, who is taking an order from a customer.

The distributed computing system 100 of FIG. 1 also is configured to execute a process that determines if a quantity included in a sales order is reasonable. In addition, the system 100 is configured to execute configuration processes to configure how a reasonable quantity check is to be conducted during run-time operation of the system when spare parts sales orders are received. Such a reasonable quantity check process may be performed before a manufacturing process is executed, or before a delivery or some other logistics process involved in fulfilling the sales order is executed. As such, unreasonable quantities included in sales orders, which may arise for any reason including operator error in data entry, may be flagged and addressed before unnecessary subsequent actions are taken.

The MPO computing system 104, like the CRM system 102, has server-side equipment 120. In the FIG. 1 example, the server-side equipment 120 includes a service parts planning engine (SPPE) component 112 (with historical and planned manufacturing data stored in repository 128), a reasonable quantity check (RQC) component 110, and an available-to-promise (ATP) component 114, which will be described in more detail below. Generally, this server-side equipment 120 of the MPO computing system 104 accepts and processes customer sales orders received from the CRM computing system 102 and performs a reasonable quantity check. The MPO computing system 104 may similarly have various client devices, and one such device 122 is shown in FIG. 1.

The RQC component 110 includes a configuration tool component 124 and a run-time component 126. Both will be described in more detail later, but for present purposes, the configuration tool component 124 performs the processes that allow a user to configure how reasonable quantity checking is to be performed, and the run-time component 126 performs reasonable quantity checking during run-time on a particular product purchase order. Both components may utilize or call other components of the system 100 during processing.

The computing system 100 shown in FIG. 1 also includes repositories 130 and 132 of, respectively, product master data and business partner master data. The business partner master data in repository 132 also includes RQC settings for business partners, which will be described in more detail later. Generally, product master data includes database information that defines a particular product model that may be manufactured and for which a product purchase order may be received. Business partner master data includes database information about business partners, which includes, for example, customers from which product purchase orders may be received.

Briefly, the processing of sales orders and the processing of a run-time reasonable quantity check on sales orders may operate in the FIG. 1 system as follows. Sales orders are received in, or by, the order entry component 106 of the CRM computing system 102. Information about the sales order, or the sales order itself, is then transferred by the CRM system 102 over network 108 to the MPO computing system 104. The RQC component 110 determines if a quantity measure in the sales order information is reasonable. This process may take into account the particular customer for the sales order. The SPPE component 112 includes product-based historical data, which is used to determine the reasonable quantity of a product. The ATP component 114 performs functions to ensure that a spare parts sales order is fulfilled as promised to the customer. A result of a reasonable quantity check performed by the RQC component 110 may, for example, determine if the ATP component 114 needs to perform another check on the sales order before it is confirmed.

In more detail, the RQC component 110 may perform its reasonable quantity determination by determining if the products ordered have been requested within constraints of a predetermined reasonable quantity for each individual product for that customer. For example, a sales order for client Adam may request 1000 oil filters, and a predetermined reasonable quantity of oil filters that can be ordered at this time by client Adam may be 100. In such a case, the RQC component 110 may flag the requested quantity by client Adam for oil filters as unreasonable. In that case, the sales order may not be confirmed and further inquiry may be deemed to be needed. The order entry component 106 on the CRM computing system 102 may then be informed of the status of the sales order by way of the network 108. This allows a sales agent, for example, to either change the number of oil filters ordered by client Adam to an amount within the reasonable quantity, or alternatively, to confirm with client Adam the number of oil filters ordered is correct and then note an acceptable reason on the sales order for the extraordinary quantity. The order entry component 106 may then transfer by way of the network component 108 to the MPO computing system 104 the sales order to the RQC component 110, which then processes and confirms the order.

Figure 2:
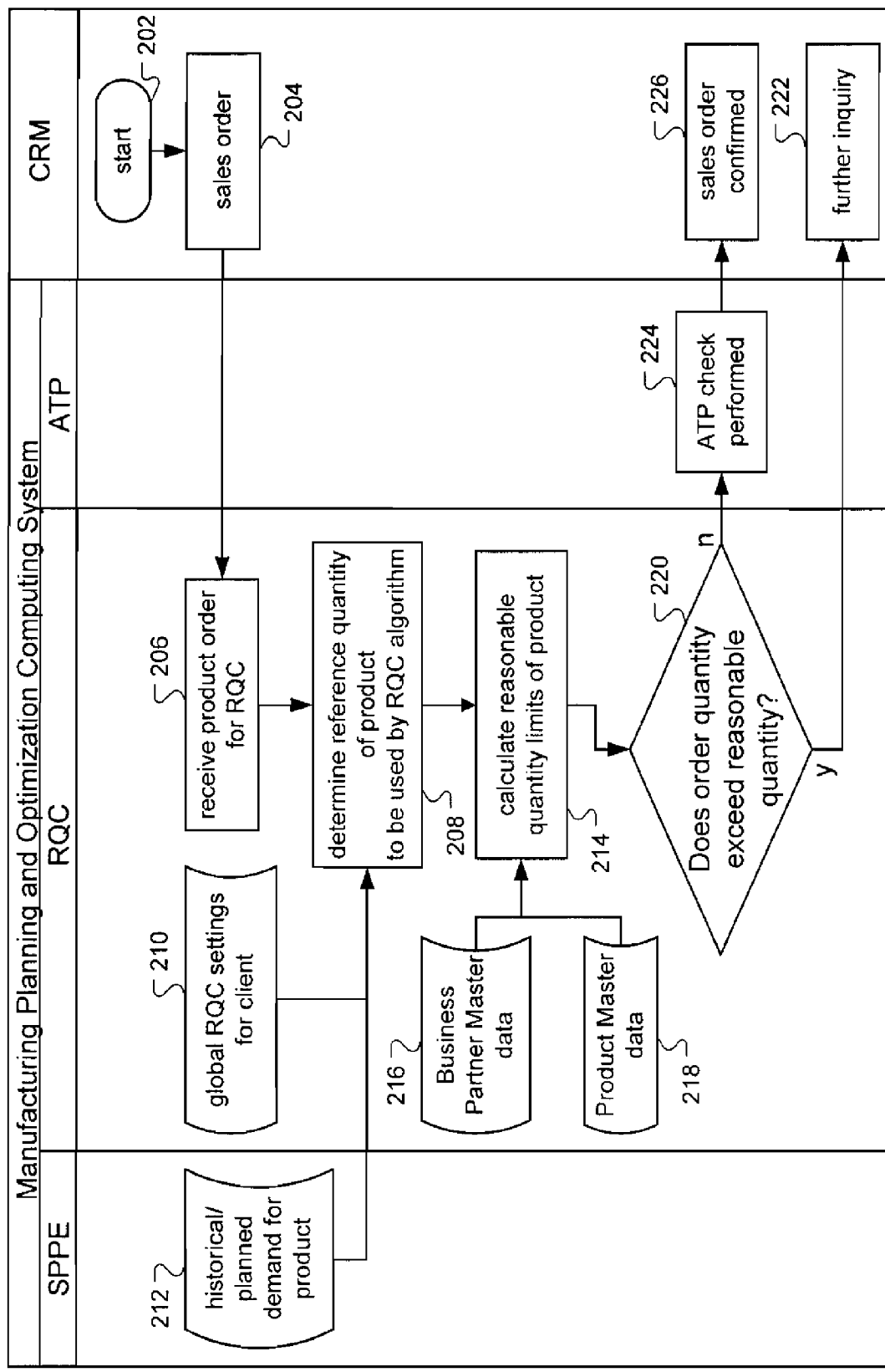
FIG. 2 is an overview-level flow chart of a reasonable quantity checking method that may be implemented in the system shown in FIG. 1.

FIG. 2 is an over-view level flow chart that depicts exemplary steps for implementing a sales order method using spare parts sales order reasonable quantity checking techniques. The sales order method shown in FIG. 2 may be implemented within the system shown in FIG. 1. A sales order method 200 begins in the CRM computing system 102 at the start step 202. This can occur, for example, when CRM computing system 102 is running and an operator, by means of client device 118, initiates a particular function. The sales order method 200 continues to step 204 with a sales agent, for example, entering a customer's sales order, for example, by means of client device 118. Alternately, the CRM computing system 102 may receive electronic information, which may cause the sales order to be created. The sales order will contain at least one order item (which may be referred to as a product) and may include information such as product identifiers, quantities, customer name (which customer may be referred to as a client), date order was placed, requested delivery date and modes of delivery, ship-to-address, etc. The sales agent can customize the sales order by configuring global settings and individual settings for each order item. One such order item setting indicates if the reasonable quantity check should be performed. Once completed, the sales order is transferred to the MPO computing system 104 by means already described above.

Next, in step 206, the MPO computing system 104, and in particular the RQC component 110, receives the sales order to be processed, and the RQC component 110 extracts an order item designated for reasonable quantity checking. The RQC component 110, in step 208, calculates the reference quantity of the order item to be used by the RQC algorithm from information obtained from client records 210 (namely, global RQC settings for the client) and product records 212 (namely, historical/planned demand for the product). This will be further discussed in FIG. 3A.

The client records 210, which in this example are located in the RQC component 110, contain, for example, settings that are independent of products and business partners and that are only dependent on the client. An example of a business partner could a specific automobile dealership, such as Adam.

The product records 212 contain planned and historical demand for products that the manufacturer makes, stocks and sells. The quantities for each product in the SPPE (service parts planning engine) component 112 of the MPO computing system 104 represent quantities for a specified fixed period of time, for example one-month. The product records 212 and the client records 210 may be created, updated and maintained by the MPO computing system 104. The server-side equipment 120 may be designed to perform this automatically, or alternatively, an operator using various client devices 112 can access the records for creation and maintenance updates.

Next in the sales order method 200 is step 214 where reasonable quantity limits for an extracted order item are calculated. The reasonable quantity limits, in one implementation, are determined from information obtained from business partner master data records 216 and product master data records 216. These limits may be, for example, percentage values of the required quantity over the reference quantity.

Reasonable quantity limits, in the FIG. 2 example, are not maintained per individual business partner. Instead, business partner groups for the reasonable quantity check of order quantity (each known as a "RQC group") are defined. Individual business partners, or clients, are placed into RQC groups for which the reasonable quantity limits are maintained. For example, there could exist three RQC groups with the names "S", "M" and "L" representing small, medium and large automobile dealerships. The business partner Adam, for example, could be placed in the "S" RQC group. The business partner master data records 216 are used to determine the RQC group, if any, for the particular business partner.

Step 214 then accesses the product master data records 218 associated with the RQC group obtained from the business partner master data records 216 and product information 218 to obtain the limits for the reasonable quantity check. The product master data records 218 include reasonable quantity percentage limits per product. They may also include reasonable quantity percentage limits per product per RQC group. After accessing the needed records, step 214 continues to calculate, from the accessed information, the reasonable quantity limits of the product.

Next, in step 220, it is determined if the quantity limits for the order item have been exceeded. If so, this information needs to be transferred to the CRM computing system 102 where, for example, a sales agent can be informed of the order status by means of, for example, client device 118. Further inquiry, in step 222, can be made and the sales order can be modified and reprocessed. If the quantity of the product ordered is within the reasonable quantity limits, the ATP component 114 will then perform another check on the sales order, in step 224. The ATP check is performed to insure that the order item and quantity requested by the client is available for purchase. A sales order confirmation is then transferred to the CRM computing system 102 where, for example, the sales agent will confirm the placement of the sales order for the customer, in step 226.

Figure 3A:
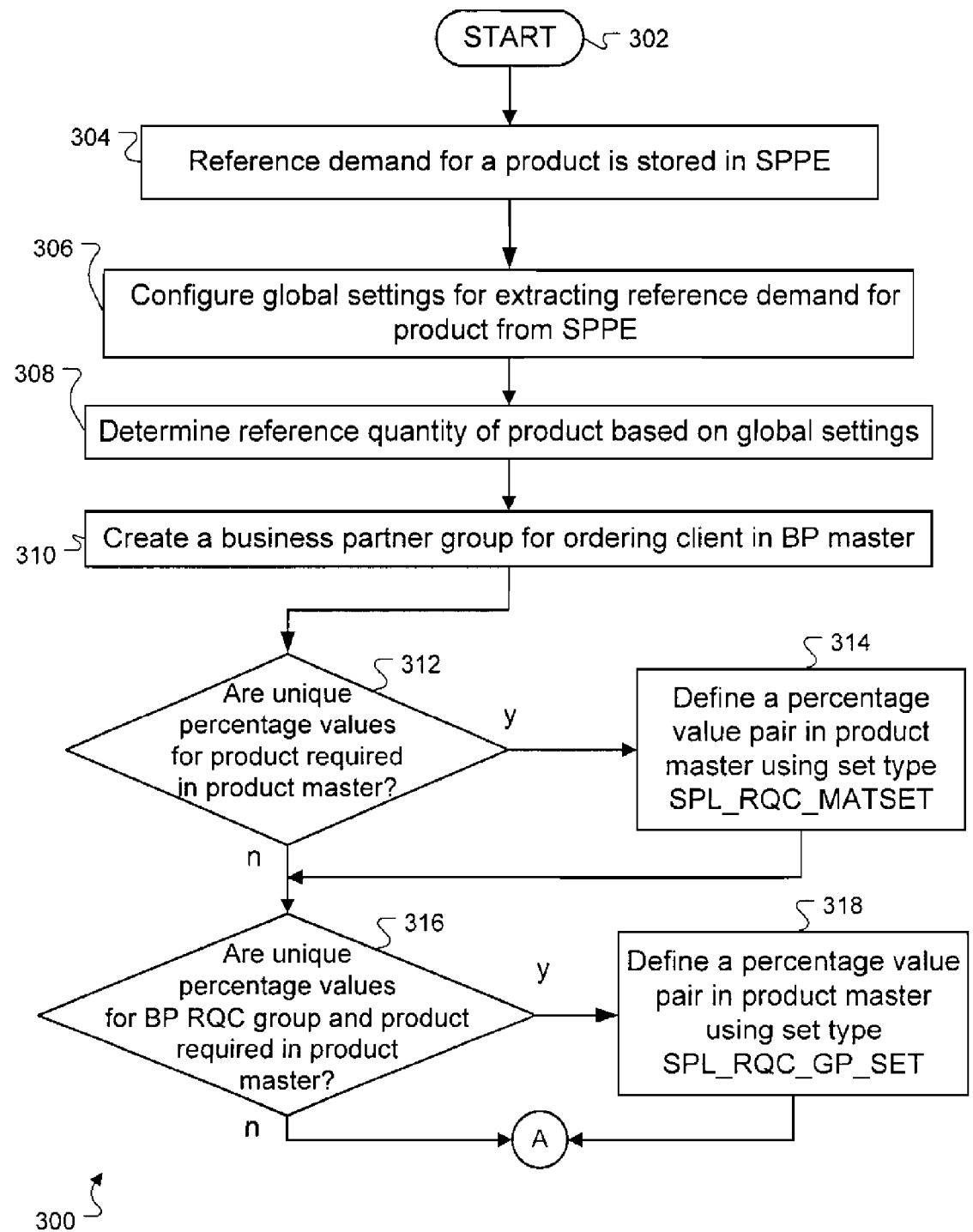
FIG. 3A-3B are more detailed flow charts of an example configuration method that may be used in the method shown in FIG. 2.
Figure 3B:
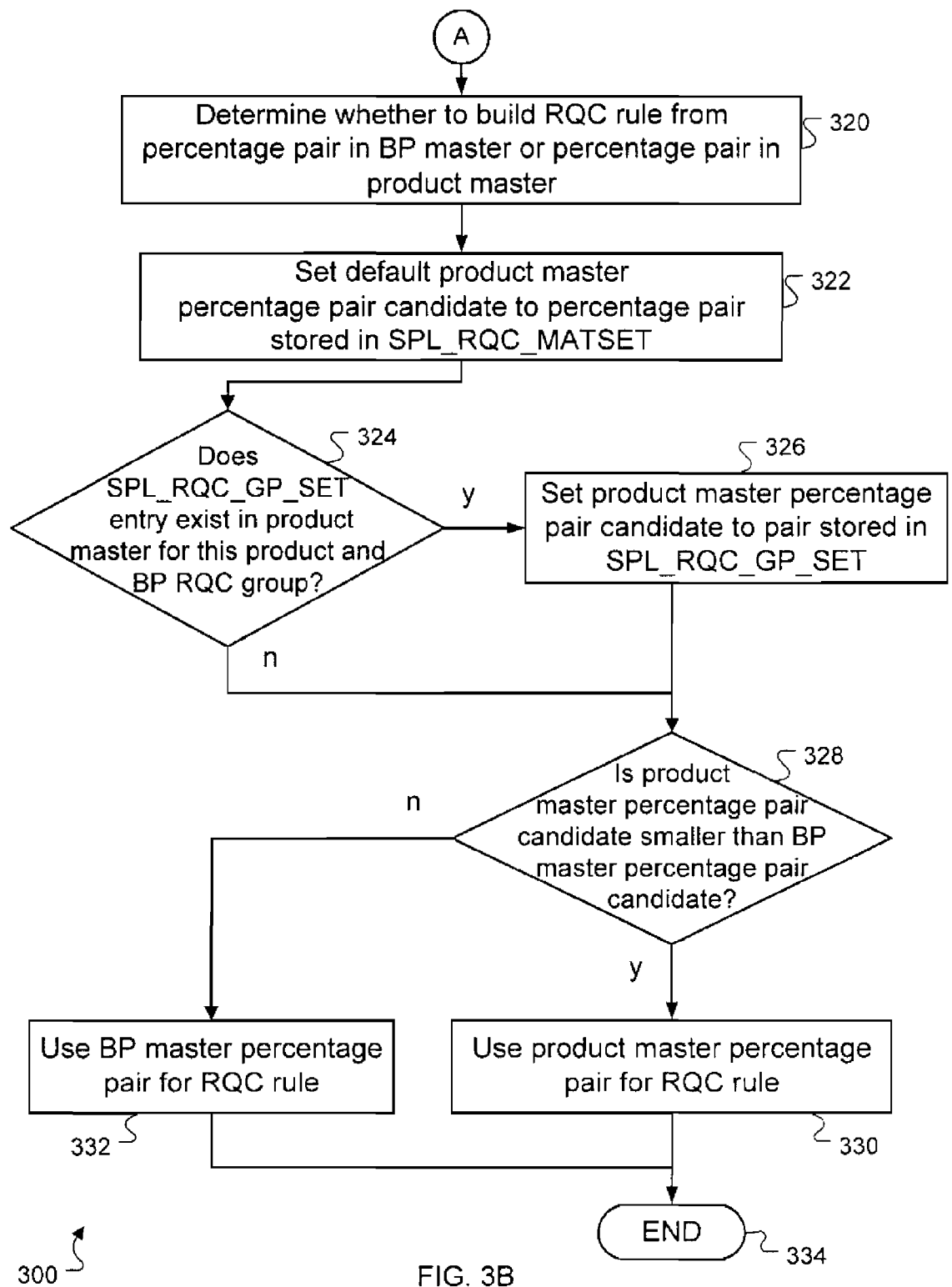

Referring to FIGS. 3A and 3B, flow charts are shown that depict exemplary steps for implementing the reasonable quantity check method of FIG. 2. Briefly, FIGS. 3A and 3B show the steps for an example planning process and reasonable quantity rule definition process. The steps may be executed by the RQC configuration tool 124 in the FIG. 1 implementation, and may involve other components of the system 100 as required.

In FIG. 3A, a processor executing instructions stored in a computer program product can perform the planning process 300. The planning process 300 starts at a start step 302. This can occur, for example, when the MPO computing system 104 is running and an operator, by means of client device 122, initiates a particular function. In step 304, a reference demand for a given product is stored in the SPPE component 112 of the MPO computing system 104 in the product records 212 (FIG. 2). This reference demand (which can also be called a reference requirement) is based on planned or historical demand for a particular product over a specified time period.

The planning process 300 proceeds to step 306 which customizes the global settings needed for the reasonable quantity check that are independent of the products or business partners. The settings are stored in the client records 210 (FIG. 2), for example, in a table on a per business partner basis. They may include, but are not limited to, a time series type and version, a date profile and date types, and a key performance indicator.

Planned and historic values for product demands are entered into the SPPE component 112 of the MPO computing system 104 dependent upon a time series which represents a fixed time period. The time series type and version are stored centrally within the MPO computing system 104 in order to identify the series whose values will be used for the reasonable quantity check.

The reference demand for a product is time-dependent, as an example, month-wise. Therefore, the period of time has to be fixed for which the requested quantity of a product is compared with the reference quantity of a product for the reasonable quantity check. For this purpose two date types are used: a "from" date and a "to" date. Through the use of assigned date rules, the date types can be defined in a flexible manner. During global customization for the reasonable quantity check, a date profile is named and defined to contain at least two date types. Because the date rules can refer to the fields of the particular sales order for a product, they are determined depending on the current sales order.

The key performance indicator specifies if historic or forecast (which may also be referred to as "planned") values for the order item should be used from the product records 212 for the reasonable quantity check. It also specifies which one of the following three criteria, based on the sales order, should be used for the reasonable quantity check: 1) the total quantity of individual units (pieces) ordered, 2) the number of order items (entries), or 3) the quantity per order item (pieces per). One implementation uses the forecast requirement quantity as the key performance indicator and this quantity is not stored per client but is a default for all reasonable quantity checks that are performed.

Next, in step 308 and similar to step 208 in FIG. 2, the reference quantity of a product is calculated based on the global settings for the reasonable quantity check. This is done using information in the product records 212 and the client records 210. Using information stored in the client records 210 for the time series and the key performance indicator (in this invention the forecast requirement quantity) for a client, a reference quantity for a product is extracted from the product records 212. This reference quantity is then adjusted based on the date profile for the client.

Now that the reference quantity for a product has been determined for the reasonable quantity check, the limits for the check need to be determined. The planning process 300 next, in step 310, defines business partner groups (RQC group), described above, for the reasonable quantity check process. Also in step 310, a business partner is assigned to an RQC group, and the business partner master data records 216 are extended to include the RQC group field. The same RQC group is stored for those business partners which should be handled in the same manner by the reasonable quantity check. For each RQC group reasonable quantity, check limits, in the form of a warning and an error percentage, are maintained. If no RQC group is maintained on the client, then the reasonable quantity check does not take place.

In step 312 it is determined if reasonable quantity check limits for the product are required in the product master data records 218. If not, the planning process 300 continues to step 316. If yes, processing proceeds to step 314 where a percentage value pair consisting of a warning limit and an error limit is defined. In addition, the product master record is extended to include this percentage value pair by creating the set type named SPL_RQC_MATSET, containing the attributes SPL_CRM_RQC_LIMIT_W, which is the RQC warning limit and SPL_CRM_RQC_LIMIT_E, which is the RQC error limit. The planning process 300 then proceeds to step 316.

Step 316 determines if reasonable quantity check limits for the RQC group and the product are required in the product master data records 218. If not, the planning process 300 continues to step 320. If yes, processing proceeds to step 318 where a percentage value pair consisting of a warning limit and an error limit is defined. In addition, step 318, extends the product master record to include this percentage value pair by creating the set type named SPL_RQC_GP_SET containing the attributes SPL_CRM_RQC_GROUP, which is the RQC group identifier that will use these limits for the specific product, SPL_CRM_RQC_LIMIT_W, which is the RQC warning limit and SPL_CRM_RQC_LIMIT_E, which is the RQC error limit. The check limits can be recorded in the product master data records 218 both dependent and independent of the RQC group as shown in steps 314 and 318. The planning process 300 then proceeds to step 320.

Referring now to FIG. 3B, the next step 320 in the planning process 300 is to determine whether to build the reasonable quantity check (RQC) rule from the limits percentage pair for the RQC group stored in the business partner master data records 216 or from the limits percentage pair stored in the product master data records 218. To begin the determination, step 322 sets the product master percentage pair candidates to the percentage pair stored in set type SPL_RQC_MATSET (described above) in the product master data records 218. Step 324 determines if there is an entry in the product master data records 218 for set type SPL_RQC_GP_SET (described above) for the RQC group of the business partner and for the product ordered. If yes, step 326 sets the product master percentage pair candidates to the values contained in set type SPL_RQC_GP_SET and proceeds to step 328. If not, the planning process skips step 326, leaving the product master percentage pair candidates set to the percentage pair stored in set type SPL_RQC_MATSET, and goes directly to step 328. In step 328 it is determined if the product percentage pair candidates are smaller than the percentage pair candidates stored in the business partner master data records 216 for the RQC group that is associated with the business partner. If yes, in step 330, the RQC rule will use the percentage pair chosen from the product master data records 218. If not, in step 332, the RQC rule will use the percentage pair from the business partner master data records 216. Steps 332 and steps 330 will both proceed to the end step 334 where the planning process 300 will terminate.

Figure 4:
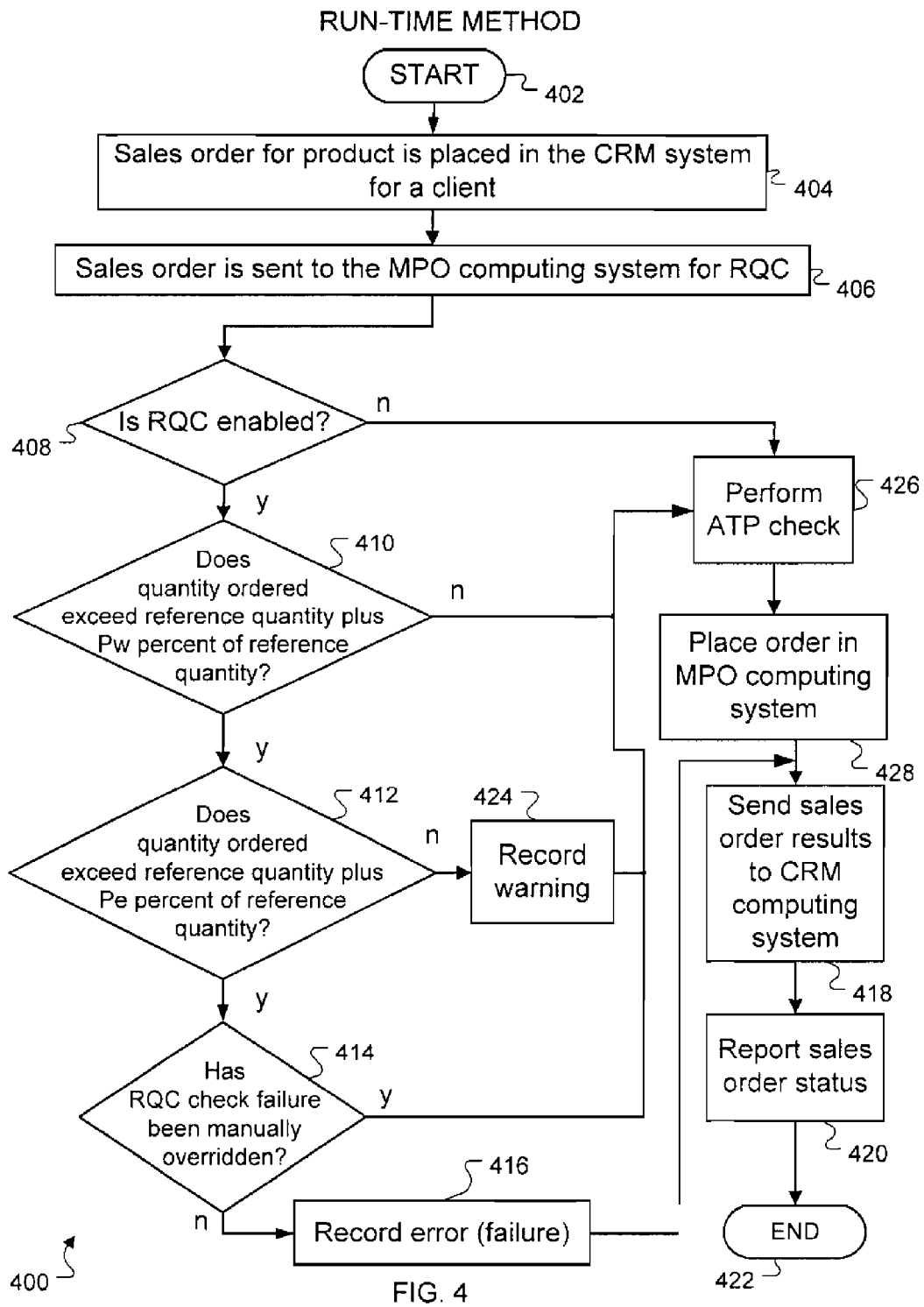
FIG. 4 is a more detailed flow chart of an example run-time method that may be used in the method shown in FIG. 2.

FIG. 4 is a detailed flow chart showing an example sales order process that may be used as the sales order method shown in FIG. 2. In FIG. 4, a processor executing instructions stored in a computer program product can perform the sales order process 400. The FIG. 4 process 400 may be performed by the RQC run-time component 126 in the FIG. 1 implementation, and may involve other components in the system 100 as needed. The sales order process 400 starts at a start step 402. This can occur, for example, when the CRM computing system 102 is running and an operator, by means of client device 118, initiates a particular function. In step 404, a sales order for a product is placed in the CRM computing system 102 for a client. This may occur by a sales agent, for example, entering into the CRM computing system 102 a customer's sales order, for example, by means of client device 118.

Alternatively, the CRM computing system 102 may receive electronic information, for example from the client, which may cause the sales order to be created. The sales order will contain at least one order item (which may be referred to as a product) and may include information such as product identifiers, quantities, customer name (which may be referred to as a client), date order was placed, requested delivery date and modes of delivery, ship-to-address, etc. A sales agent may customize the sales order by electing to enable or disable a reasonable quantity check for each order item. This may be done through a user status, which may be referred to as a reasonable quantity check of order quantity (RQCH) status. The reasonable quantity check will only be performed when this status is set for the particular order item.

Once the sales order is completed, the sales order, in step 406, is sent to the MPO computing system 104 by means of the network 108 in the form of a data package containing, among other items, the RQCH status value for each order item and all other necessary data for determining the reference and limit values for the reasonable quantity check. The RQC component 110 in the MPO computing system 104 extracts an order item from the field catalog. Step 408 checks if the RQCH status value has been enabled for the order item. If yes, the reasonable quantity check is started. The RQC rule has been previously configured, as described in FIG. 3B.

The requested quantity of the order item, determined by summing all the schedule lines for that item in the sales order, is compared to the reference quantity using the RQC rule. The reference quantity and the time period associated with it is read from the SPPE component 112. This time period may generally be more comprehensive than the one requested from the CRM computing system 102 for the sales order because the granularity may not be precise to the day. As an example, the CRM computing system 102 wants to read the period Jan. 5, 2004 to Apr. 4, 2004 as indicated in the "from" and "to" date fields on the sales order. The MPO computing system 104 instead reads the reference quantity for Jan. 1, 2004 to Apr. 30, 2004 from the SPPE component 112. The period read from the MPO computing system 104 is the actual period used for the reasonable quantity check. The actual period is conveyed back to the CRM computing system 102 in the case of an error and can be output as a message for information, as an example, to the sales agent by means of client device 118.

It is next determined if the requested quantity of the product exceeds the reference quantity of the product, and if so, by what amount, which is calculated as a percentage of the reference quantity. Step 410 compares this percentage to a warning limit percentage of the reference quantity, Pw, from the RQC rule. If the calculated percentage exceeds Pw, the calculated percentage is then compared to an error limit percentage of the reference quantity, Pe, from the RQC rule. In step 412, if Pe is exceeded, the reasonable quantity check indicates that for the sales order and order item, an unreasonable quantity has been requested and the check has failed. Step 414 determines if the reasonable quantity check has been manually overridden in the sales order by the appropriate setting of the user status for the order item. For example, a sales agent may indicate in the sales order, by checking certain boxes, that the order item quantity is reasonable even though it has been declared as unreasonable by the reasonable quantity check. If this occurs, the sales order process 400 continues to step 426.

If the reasonable quantity check determines that the requested quantity of the order item is unreasonable, the ATP check is not performed and an error is indicated for the order item in step 416. This error, as well as other information about the sales order, is transferred to the CRM computing system 102 in step 418. Step 420 reviews the results of the sales order and reports any errors, warnings or other status to the user by placing a message in the application log and by, for example, displaying to the user, for example a sales agent, the order results by means of client device 118. The sales process 400 proceeds to the end step 422 where the process terminates.

If, in step 412, the requested quantity of the order item did not exceed the reference quantity plus Pe, but it did exceed the reference quantity plus Pw, a warning is indicated for the order item in step 424. The sales order process then proceeds to step 426. If, in step 408, the reasonable quantity check for the order item was disabled, the sales order process continues to step 426. If, in step 410, the requested quantity is not larger than the reference quantity of an order item, the sales order process 400 proceeds to step 426. If the reasonable quantity check has failed in step 412 and has not been manually overridden, as determined in step 414, then the sales order process 400 also proceeds to step 426.

Step 426 executes the Available to Promise (ATP) check The ATP check is performed to insure that the order item and quantity requested by the client is available for purchase. The positive result of this check indicates that the requested quantity of the order item has been approved for sale to the client and the order is placed in the MPO computing system 104. If the ATP check fails the order is not placed in the MPO computing system 104 for the client. The result of the ATP check is then indicated in the sales order. Next, in step 418, information about the sales order is transferred to the CRM computing system 102. Step 420 reviews the results of the sales order and reports any errors, warnings or other relevant information to the user. This may be done by placing messages related to this information in an application log and by, for example, displaying to the user, for example a sales agent, the order results by means of client device 118. The sales process 400 proceeds to the end step 422 where the process terminates.

The following example further illustrates the reasonable quantity checking techniques. In the example, a client Adam, an authorized dealer of automotive spare parts, places an order for oil filter spare parts by telephoning an automobile company, for example, Ford. He is placed in contact with a sales agent who enters his sales order, as in step 404, into the CRM computing system 102 by means of client device 118, which for this example is a desktop computer. The sales agent includes in the sales order the client's name, Adam, the order item, oil filters, the requested quantity, 900, as well as the current date, the requested receipt date, and other information relative to a sales order. The sales agent enables the reasonable quantity check for the requested oil filter quantity by enabling the RQCH status flag for the order item, as described above. The sales agent indicates that the sales order is complete, for example, through a control on the display device screen of the desktop computer. Once this action occurs, step 406 sends the sales order to the MPO computing system 104 to be processed.

Once received, the MPO computing system 104 extracts the order item from the sales order. The RQC component 110 on the MPO computing system, in step 408, determines that the RQCH status flag has been enabled for this order item and therefore the reasonable quantity check is to be performed. Information about the client, Adam, is retrieved from the global RQC setting for the client 210 and is used to determine the reference quantity of the order item as described above in steps 306 and 310 (FIG. 3A). The reference quantity and its associated time period are read from the SPPE component 112. For example, the sales order indicates a request for 900 oil filters for receipt by Mar. 30, 2005 and is dated Mar. 16, 2005. Client Adam previously ordered and received 900 oil filters in February of 2005. Based on these dates, a forecast quantity for oil filter orders for the month of March 2005, 2000, is used as the reference quantity.

The client, Adam, is a small dealer. As described above, an RQC group can be established where "S" stands for small dealers and RQC rules can be maintained in the business partner data records 216 dependent upon the RQC group. As an example, in step 310, the business partner data record for the RQC group "S" with which client Adam is associated indicates a warning percentage limit, Pw, of 2.00% and an error percentage limit, Pe, of 3.00%. Next, as described above in FIGS. 3A and 3B, the product master percentage pair for the RQC rule is determined. In this example, the product master data record for oil filters indicates a warning limit of 5.00% and an error limit of 7.00%. Also, in this example, the business partner master data record for small dealers ordering oil filters indicates a warning limit of 1.50% and an error limit of 2.00%. Following the steps described above in FIGS. 3A and 3B, it is determined that the RQC rule for client Adam ordering oil filters is a warning limit of 1.50% and an error limit of 2.00%. Step 410 determines that the order quantity, 900, does not exceed the reference quantity, 2000, and an ATP check is then performed in step 426. The order for 900 oil filters is placed in the MPO computing system 104 in step 428 for the client, Adam. The result of the sales order is sent to the CRM computing system, in step 418. The results are reported back to the sales agent in step 420, for example, as a screen on a display device, indicating that the client's order has been successfully placed. The sales agent, for example, can then inform client Adam of the status of the sales order.

In another example, if client Adam wanted to order 900 oil filters but the sales agent, by error, entered 9000 as the oil filter quantity, the sales order process as described above would retrieve the same reference quantity and RQC limits. In this case, however, the checks in steps 410 and 412 would indicate that the ordered quantity of oil filters, 9000, exceeds the reference quantity of oil filters, 2000, by the percentage, Pw, as well as the percentage, Pe. The RQC check would fail and since it was not overridden, in step 414, an error would be indicated, as in step 416. This status would be sent back to the CRM computing system 102 in step 418 and the sales agent would, for example, receive the status in step 420 on the display device of the desktop computer. The sales agent may then review the sales order information, see the error, and enter the correct quantity for the order item and reprocess the sales order.

In another example, if client Adam wanted to order 3000 oil filters because there was a recall on the part and he anticipated an increased demand, the sales order process above would again retrieve the same reference quantity for the order item. The requested quantity would also, as described above, fail the reasonable quantity check and because it was not overridden in step 414, an error would be indicated in step 416. This status would be sent back to the CRM computing system 102 in step 418 and the sales agent could, for example, receive the status in step 420 on the display device of the desktop computer. The sales agent may then contact client Adam to verify the quantity ordered for the item. Adam would verify the request and the sales agent would note these special circumstances in the sales order, thus allowing the reasonable quantity check to be overridden for this particular item in this sales order. The sales agent may then reprocess the order, which would proceed as described above. However, in step 414, it would be determined that the reasonable quantity check failure had been overridden and the sales order could continue to be processed.

As another example, client Adam orders 2035 oil filters. The sales order process proceeds as described above, however, in step 410 it is noted that the order quantity exceeds the reference quantity by 35, which is 1.75% of the reference quantity. The Pw of 1.5% has been exceeded, but in step 412 it is noted that the Pe of 2.00% has not been exceeded. A warning for this order item is indicated. The ATP check is nevertheless performed at step 426 and the order is placed at step 428. The sales agent, upon receiving the status of the sales order in step 420, may inform the client Adam of the warning.

If client Adam decides to order 2150 oil filters, the order process will proceed as described above but in step 410 it is noted that the order quantity exceeds the reference quantity by 150, which is 7.5% of the reference quantity. As such, the Pw of 1.5% has been exceeded. In step 412, it is noted that the Pe of 2.00% has also been exceeded. A error for this order item is indicated. As such, the ATP check is not performed and the order is not placed. The results of the sales order are sent to the CRM computing system 102 at step 418. The sales agent, upon receiving the status of the sales order in step 420, may inform the client Adam of the error requesting corrective action.

Figure 5A:
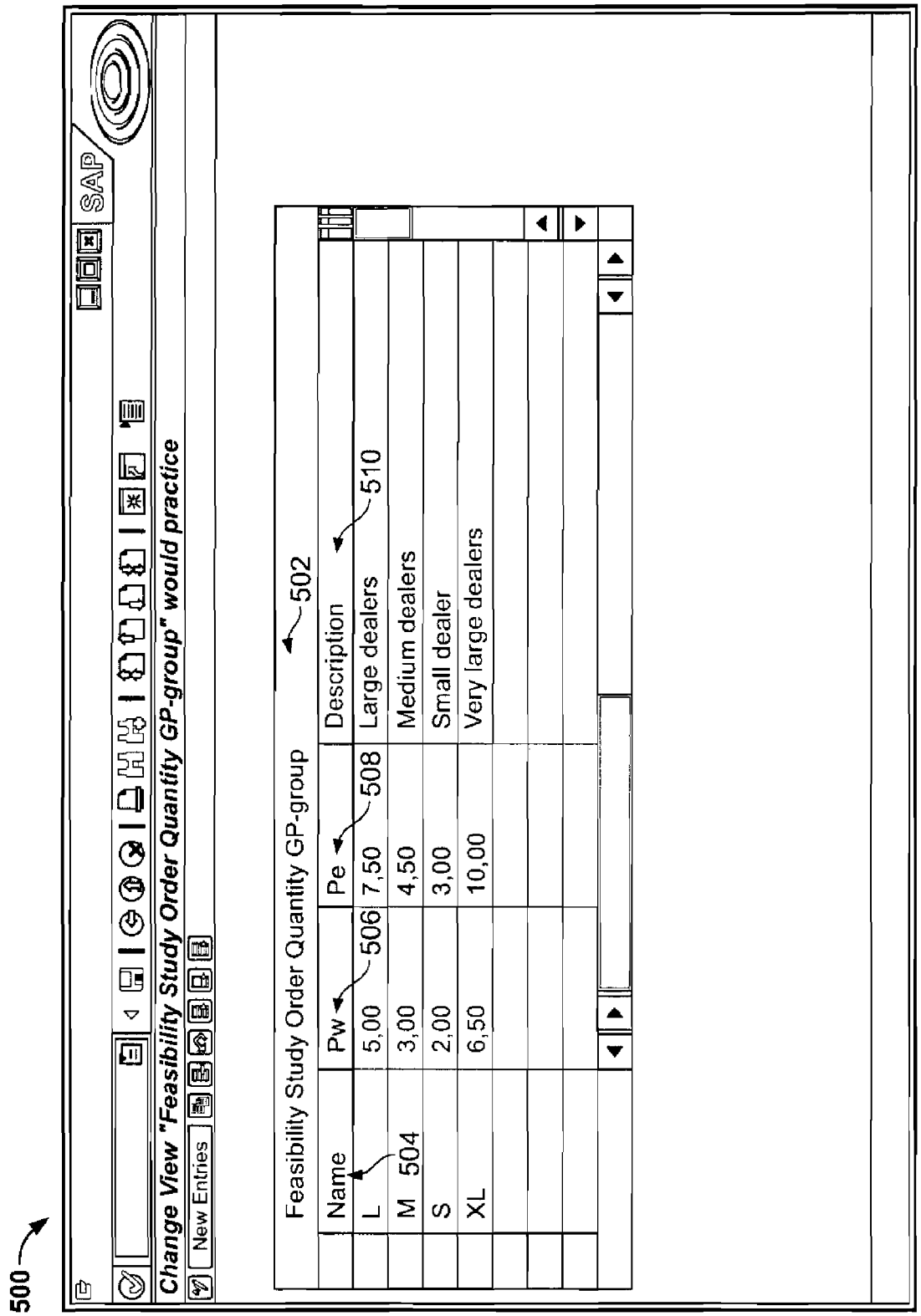
FIG. 5A-5B are a series of display device screen snapshots that show an example spare parts sales order reasonable quantity check rule definition process that may be used in the method of FIG. 2.
Figure 5B:
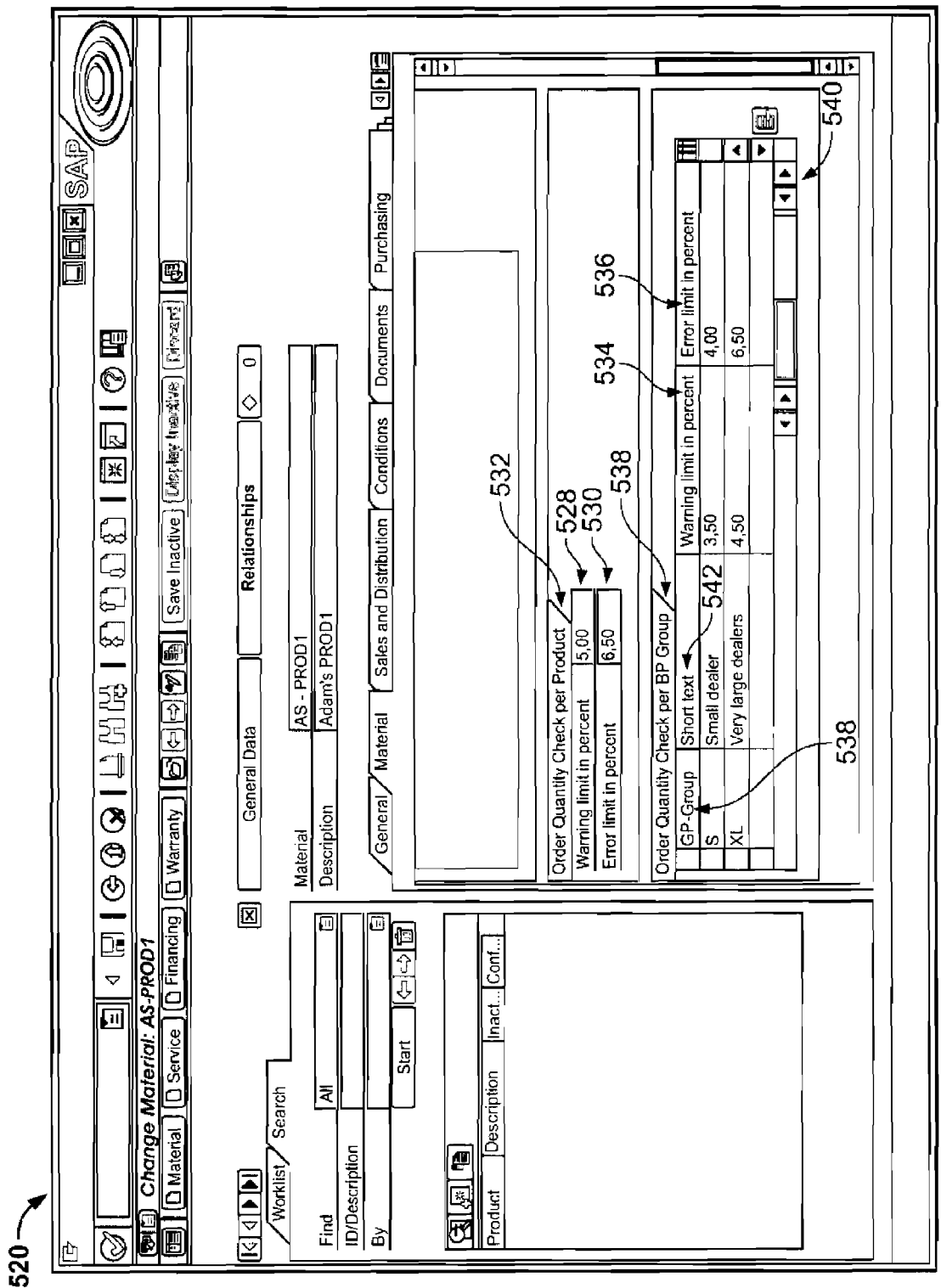

FIGS. 5A and 5B are example display device screen shots showing the sales order reasonable quantity check rule definition process that may be used in the planning method 200 shown in FIG. 2. FIG. 5A is a screen shot 500 showing the RQC group 502, as described above, and their names 504, Pw 506, Pe 508, and a description for each RQC group 510. This screen, for example, can be used by an operator who by means of client device 122 can enter the information in the table.

FIG. 5B is a screen shot 520 showing the information that can be obtained from the product master data records 218 to determine the product master percentage for the RQC rule as shown above in the planning process 300 shown in FIG. 3. The order item and the client name are included in a relationships section. The RQC rule limits, Pw 528 and Pe 530, based on the product 532 are shown. This is the set type SPL_RQC_MATSET in the product master data record for the order item "AS_PROD1". The RQC rule limits, Pw 534 and Pe 536, are also shown based on the product per the business partner group 538 (which is also referred to as the RQC group). The business partner groups that have limits for product "AS_PROD1" are shown by their names in the first column 538 of the order quantity check per BP group table 540. Column 542 includes a description of the business partner group.

Figure 6:
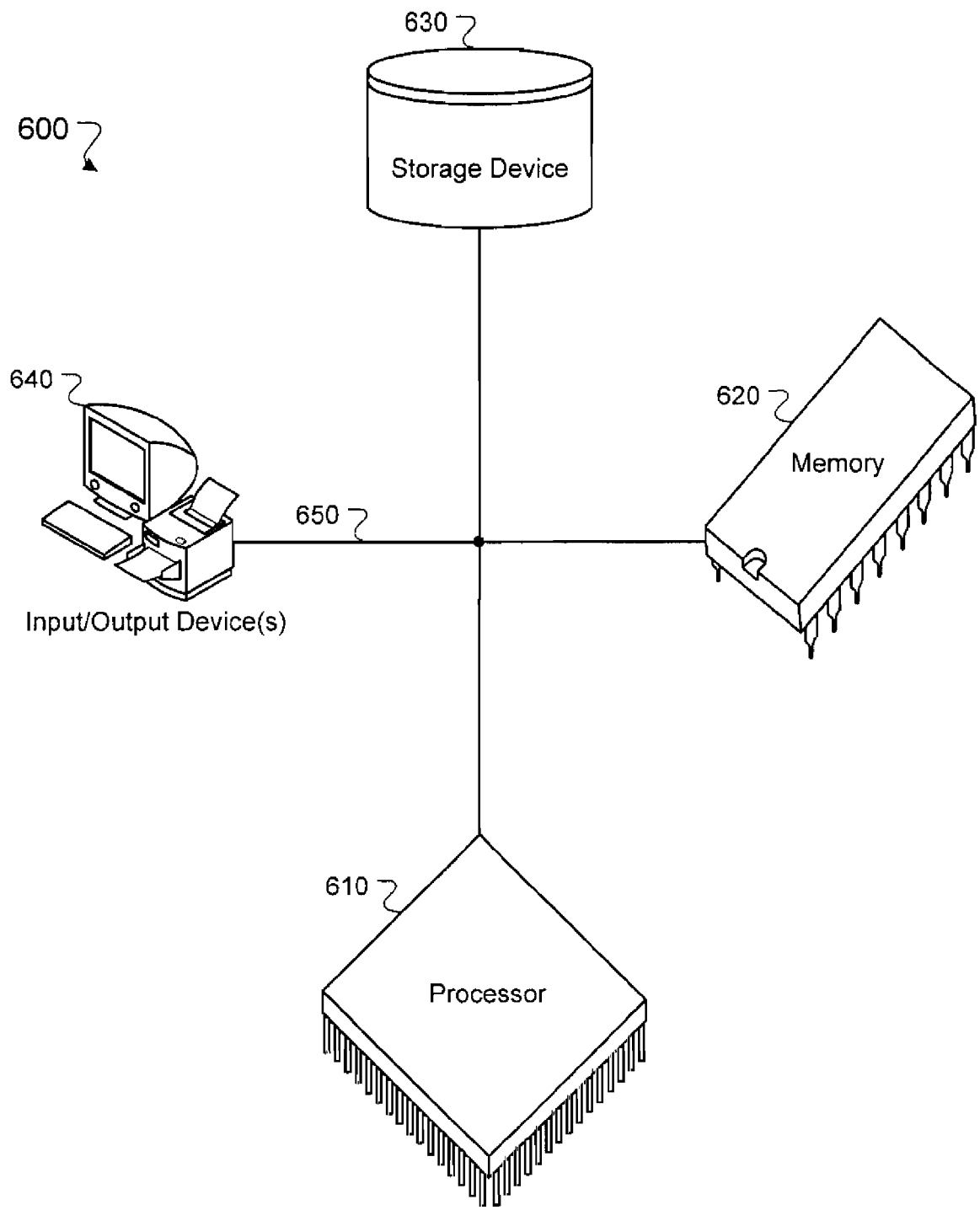
FIG. 6 is a schematic diagram of a computer system that may be used to execute the disclosed computer-implemented methods.

FIG. 6 is a schematic diagram of a generic computer system 600. The system 600 can be used for the operations described in association with the planning process 300 according to one implementation. For example, the system 600 may be included in either or all of the CRM computing system 102, the MPO computing system 104, and the client devices 118 and 122.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Also, the logic flows depicted in the figures do not require the particular order shown, or sequential order, to achieve desirable results. Also, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for processing electronic purchase orders, the method comprising:
    determining, during a planning phase, a user-defined configurable reasonable quantity rule to be used during processing of electronic purchase order information, wherein the reasonable quantity rule includes reference quantity information for an estimated number of spare parts that will be needed to be produced during a given period to satisfy expected purchase orders of the spare parts, a warning threshold percentage, and an error threshold percentage that is greater than the warning threshold percentage;
    receiving an electronic purchase order, and upon receiving the electronic purchase order, determining a reference quantity based on the reference quantity information and at least one of a product record for a product specified in the electronic purchase order or a client record corresponding to a client for whom the electronic purchase order was received;
    calculating a variance percentage, the variance percentage corresponding to a percentage by which a quantity value included in the electronic purchase order exceeds said reference quantity;
    comparing the variance percentage to the warning threshold percentage and the error threshold percentage; and
    when the variance percentage is less than or equal to the warning threshold percentage, processing the electronic purchase order; and when the variance percentage is greater than the warning threshold percentage but less than or equal to the error threshold percentage, processing the electronic purchase order and generating a warning indicator; and when the variance percentage is greater than the error threshold percentage, performing a confirmation process that the quantity value is correct before processing the electronic purchase order, wherein processing the electronic purchase order comprises causing the electronic purchase order to be fulfilled.

2. The computer-implemented method of claim 1, wherein the electronic purchase order is for automobile spare parts and includes electronic data entered by agents of automobile dealers.

3. The computer-implemented method of claim 2, wherein the reasonable quantity rule is dependent on a particular automobile dealer.

4. The computer-implemented method of claim 1, wherein the method further comprises forwarding the warning indicator to a device associated with the electronic purchase order, when the warning indicator is generated.

5. A computer-readable medium comprising executable instructions that when executed perform operations comprising:
- determining, during a planning phase, a user-defined configurable reasonable quantity rule to be used during processing of electronic purchase order information, wherein the reasonable quantity rule includes reference quantity information for an estimated number of spare parts that will need to be produced during a given period to satisfy expected purchase orders of the spare parts, a warning threshold percentage, and an error threshold percentage that is greater than the warning threshold percentage;
- receiving an electronic purchase order, and upon receiving the electronic purchase order, determining a reference quantity based on the reference quantity information and at least one of a product record for a product specified in the electronic purchase order or a client record corresponding to a client for whom the electronic purchase order was received;
- calculating a variance percentage, the variance percentage corresponding to a percentage by which a quantity value included in the electronic purchase order exceeds said reference quantity;
- comparing the variance percentage to the warning threshold percentage and the error threshold percentage; and
- when the variance percentage is less than or equal to the warning threshold percentage, processing the electronic purchase order; and when the variance percentage is greater than the warning threshold percentage but less than or equal to the error threshold percentage, processing the electronic purchase order and generating a warning indicator; and when the variance percentage is greater than the error threshold percentage, performing a confirmation process that the quantity value is correct before processing the electronic purchase order, wherein processing the electronic purchase order comprises causing the electronic purchase order to be fulfilled.

6. The computer-readable medium of claim 5, wherein the electronic purchase order is for automobile spare parts and includes electronic data entered by agents of automobile dealers.

7. The computer-readable medium of claim 6, wherein the reasonable quantity rule is dependent on a particular automobile dealer.

8. The computer-readable medium of claim 5, wherein the operations further comprise forwarding the warning indicator to a device associated with the electronic purchase order, when the warning indicator is generated.

9. The computer-readable medium of claim 5, wherein the reference quantity corresponds to a predetermined period of time.

10. The computer-readable medium of claim 5, wherein calculating the variance percentage comprises calculating a percentage by which a sum exceeds the reference quantity, wherein the sum comprises a sum of the quantity value included in the received electronic purchase order and one or more quantity values in one or more corresponding previously received purchase orders that were received within the predetermined period of time before the electronic purchase order was received.

11. The computer-readable medium of claim 5, wherein the operations further comprise performing an available-to-promise check to confirm that the electronic purchase order can fulfilled.

12. The computer-readable medium of claim 5, wherein the operations further comprise deriving the reference quantity from the reference quantity information based on at least one of product information, client information, or a time period.

13. The computer-readable medium of claim 5, wherein the reasonable quantity rule comprises a plurality of possible warning threshold percentages and a plurality of possible error threshold percentages; wherein the operations further comprise selecting the warning threshold percentage from the plurality of possible warning threshold percentages and selecting the error threshold percentage from the plurality of possible error threshold percentages based on a characteristic of a client that is associated with the electronic purchase order.

* * * * *